L. BURGESS.
PROCESS OF REDUCING ALUMINUM OXID.
APPLICATION FILED AUG. 15, 1919.

1,379,523.

Patented May 24, 1921.

L. BURGESS.
PROCESS OF REDUCING ALUMINUM OXID.
APPLICATION FILED AUG. 15, 1919.

1,379,523.

Patented May 24, 1921.
2 SHEETS—SHEET 2.

WITNESS:

INVENTOR.
Louis Burgess
BY
his ATTORNEYS

UNITED STATES PATENT OFFICE.

LOUIS BURGESS, OF NEW YORK, N. Y., ASSIGNOR TO STANDARD OIL COMPANY, A CORPORATION OF NEW JERSEY.

PROCESS OF REDUCING ALUMINUM OXID.

1,379,523. Specification of Letters Patent. Patented May 24, 1921.

Application filed August 15, 1919. Serial No. 317,687.

*To all whom it may concern:*

Be it known that I, LOUIS BURGESS, a citizen of the United States, residing at New York city, in the county of New York and State of New York, have invented a certain new and useful Process of Reducing Aluminum Oxid, of which the following is a specification.

My invention relates to new and useful improvements in processes for the reduction of aluminum oxid, either pure or mixed, or combined with other substances, as for example, the crude ore of aluminum, bauxite. The invention particularly contemplates the treatment of the material described, in order to reduce the same to alumino metallic alloys, combinations of alloys with aluminum carbid, and aluminum carbid with or without percentages of aluminum metal.

I have demonstrated that any one of the resulting products above mentioned may be produced by mixing aluminum oxid, or aluminum oxid-containing-material, such as bauxite, with carbon, and subjecting the same to the heat influence of the electric arc. I have demonstrated that in order to secure satisfactory reduction, the reaction between the carbon and the aluminum oxid takes place at a temperature above that at which aluminum oxid volatilizes, and must therefore take place in the vapor state or condition of the aluminum oxid. I have also discovered that reduction cannot be satisfactorily accomplished by passing a current through the charge consisting of a mechanical mixture of aluminum oxid and carbon in the absence of a separate resistance heating element or an arc, as the boiling point of the aluminum oxid is below the temperature of reduction, and limits the temperature attainable by this method to a boiling point below reduction temperatures.

It is difficult to carry out the reaction with satisfactory results by merely mixing the aluminum oxid, or aluminum oxid-bearing material, such as bauxite, with carbon and attempting the reduction of the same in an electric furnace, because the heat melts the aluminum oxid before reduction can take place so that it flows away from proper intimate mixture with the carbon, and by continuously melting tends to prevent the attainment of the requisite temperature of reaction between aluminum oxid and carbon.

When operating with an arc furnace, it is difficult to maintain the arc because of the fact that the charge forms a shell surrounding the zone of reaction, which shell is of such high electrical conductivity that the normal arc between the electrodes or between the upper electrode and the floor of the zone of reaction is short circuited and an arc results between the side of the electrode and an edge of the shell. This shell extends itself gradually upward during the run, along the side of the vertical electrode, and the resulting arc travels in the same manner and is not maintained in the desired place. Such an arc produces only small quantities of reduced products, and does not yield any results approximating the commercial.

I have discovered that the difficulty is solved by forming an intimate mixture of aluminum oxid or aluminum oxid-bearing material with carbon, and forming the same in a mass, preferably one in which the aluminum oxid is incased in a matrix composed of carbon or carbonaceous material, and subjecting the charge so produced to the influence of an arc within the same. When such a material is broken into pieces or particles consisting of aluminum oxid incased in a matrix of carbon, and the said pieces or particles are subjected to the influence of the electric arc inclosed thereby and in close proximity thereto, the difficulties above referred to are obviated or reduced to such an extent as to be negligible, and the aluminum oxid may be reduced without difficulty. The furnace may be thus operated either for long intermittent periods or continuously, and industrial quantities of reduced material produced.

I have hereinafter described several modifications or aspects of the invention, all working on the same principle but producing different products, according to the character of aluminum oxid used and the proportions of the aluminum oxid and carbon employed in the mixture subjected to the arc.

The invention consists in the method to be more fully described hereinafter, and the novelty of which will be particularly pointed out and distinctly claimed.

My invention may be practised with any suitable arc furnace, but I have shown in the accompanying drawings, three types of furnaces best suited for the purpose, and in which drawings—

Figure 1:
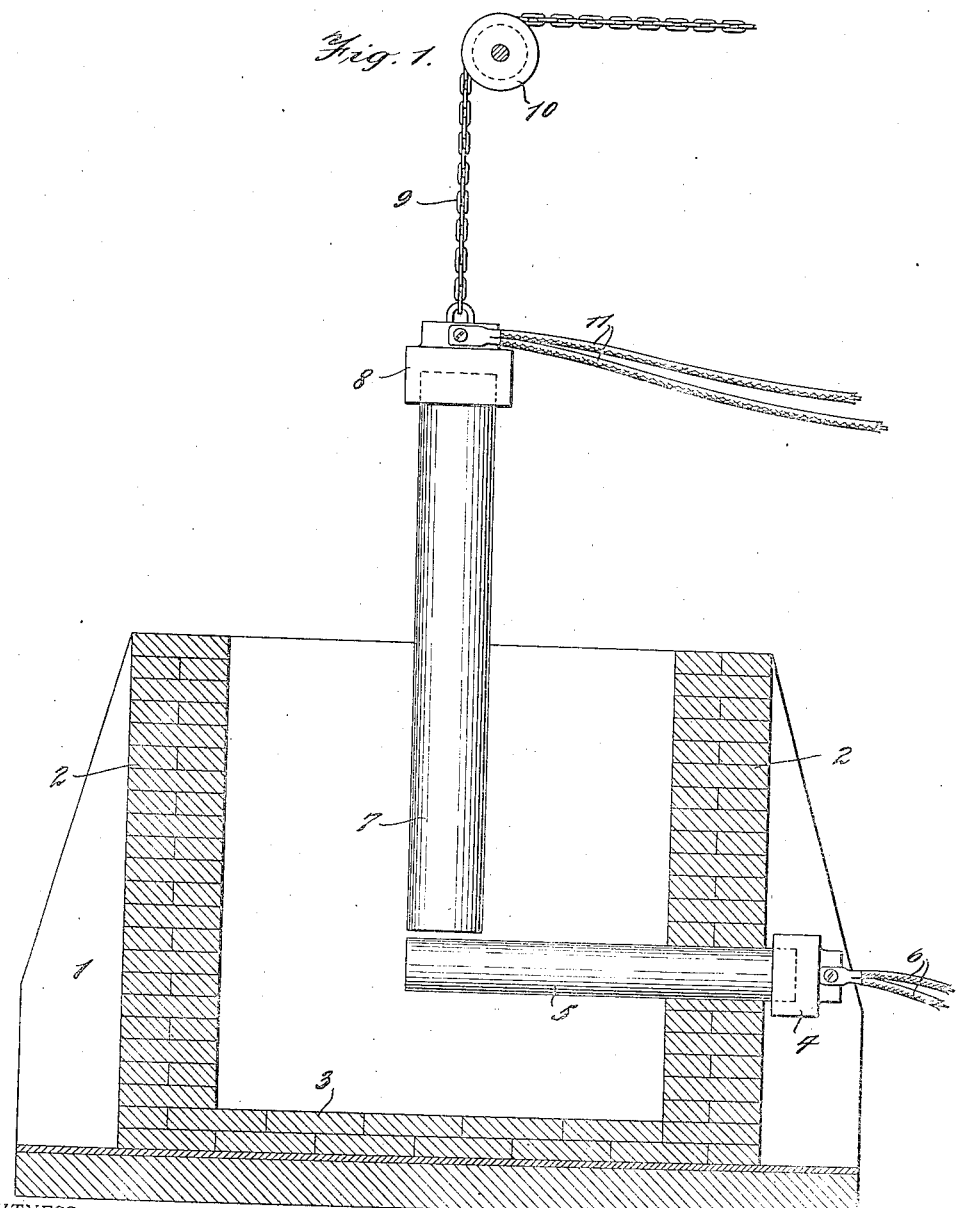
Figure 1 is a vertical sectional view of one type of furnace for using a single-phase current.

In operating my invention I am able to produce several different products, for example—

I. Aluminum carbid which may contain percentages of aluminum metal;

II. Alumino metallic alloys, and

III. Aluminum carbid with or without the carbids or metals resulting from the reduction of the non-aluminous oxids in the charge, or with or without alloys of these metals with aluminum.

The first result takes place when using a substantially pure oxid of aluminum. In this case, when using the theoretical proportions of oxid of aluminum and carbon to reduce the oxid with the formation of carbon monoxid and to form a carbid (viz. substantially 204 parts of oxid to 108 parts of carbon) the product is aluminum carbid containing a minor percentage of aluminum metal. The element aluminum is substantially eliminated by using an excess of carbon and increased by using less carbon down to the proportion of carbon required to reduce the oxid with the formation of carbon monoxid, but not to form a carbid, viz., substantially 204 parts of oxid to 72 parts of carbon. In practice I have obtained good results using a charge composed of two parts of oxid to one of carbon.

The second and third results take place when using an impure oxid of aluminum, such as crude ore bauxite.

The second result is obtained from an impure oxid by using substantially sufficient carbon to reduce the oxids but not to form a carbid. In practice I have obtained good results in producing this second product, using a charge containing 22% of carbon, the remainder consisting of a calcined anhydrous bauxite running about seventy-eight (78) per cent. aluminum oxid ($Al_2O_3$), and the balance iron oxids and silicon oxid (silica).

In practice I have obtained good results in producing the third product using a charge containing 27% of carbon.

The charge may be prepared by incorporating the aluminum oxid used, preferably in a more or less finely divided or pulverized and anhydrous condition, with the requisite amount of pitch, preferably in a steam jacketed mechanical mixer and then heating the mass slowly up to a red or yellow heat, preferably in a reducing atmosphere until coked.

I do not desire to be limited to the bonding material mentioned, as any suitable bonding material could be employed, that would produce a carbonaceous matrix. For instance, the bonding material might be coal tar pitch, petroleum pitch, oxidized asphalt (viz. the product made by oxidizing petroleum pitch), starch, sugar, soft coal, or any combination of these materials, with or without the addition of free carbon.

In practice, I have made the charge satisfactorily, by mixing the aluminum oxid used in an anhydrous and pulverized or granulated form with an oxidized petroleum pitch having a melting point of 265° F. employing approximately 650 lbs. of the oxid to 500 lbs. of pitch, and thereafter coking the mixture by carrying the same gradually up to a yellow heat in iron vessels, and preferably in a reducing atmosphere.

After coking, the charge is ordinarily extracted in lumps too large for furnace use and should be ground by any suitable means. In practice, I have obtained satisfactory results with a charge ground in a jaw crusher to particles of a maximum size of about ½".

By the treatment just mentioned of mixing the aluminum oxid and pitch, and then coking the same, a coky material is produced in which the aluminum oxid is incased in a matrix of carbon, is disseminated throughout the matrix of carbon in a finely divided condition, and the particles of finely divided aluminum oxid-bearing material are supported in and by the said matrix.

The subsequent procedure in reducing the charge is as follows:—

I preferably employ any ordinary type of arc furnace having one or more depending, adjustable, vertical electrodes. I may thus employ single-phase or polyphase currents. When using single-phase currents I may employ either a bottom electrode, (see Fig. 1), or a carbon bottom connected to a source of current (see Fig. 2), in combination with an adjustable, vertical electrode connection. When employing three phase currents, I may use a furnace having three vertical, adjustable electrodes and a conducing bottom which may or may not be connected with a neutral or common return electrical connection (see Fig. 3).

I do not wish to limit myself to the particular form of furnace described, as other forms of electric furnaces may be employed but do not ordinarily give as satisfactory results, owing to the lack of suitable electrode regulation. It is desirable for best results that the furnace must be operated in such a way as to produce a closed arc, irrespective of the type of furnace.

In order that my invention will be fully understood, I have shown in Fig. 1 of the drawings a sectional view of one form of arc furnace which may be efficiently employed in carrying out the said invention.

I will describe briefly a preferred form of the apparatus shown in Fig. 1, and then the manner in which it is employed to perform the process.

Referring to Fig. 1 by characters of reference, 1 designates a furnace which may be of any suitable type consisting of side walls 2, and a bottom 3, built up of brick or other suitable material. Supported in one side of this furnace is a fixed electrode holder 4, supporting a horizontally disposed electrode 5, which extends into the interior of the furnace such a distance that the inner end of said electrode is located at substantially the central portion of the furnace. Electric current may be led to the said electrode by any suitable means, for example, the lead, shown at 6. 7 designates a vertically disposed electrode, preferably located adjacent the vertical axis of the furnace, and preferably supported in such a manner that it is vertically adjustable so that it may be made to contact with electrode 5 and adjusted or withdrawn vertically so as to maintain any desired distance between the ends of the electrode during the performance of the process. The center electrode is preferably supported by an electrode holder 8, which is connected to any suitable mechanical means for raising and lowering the electrode, for example, a chain 9 extending over a pulley 10 and connected to a winch or suitable raising and lowering means (not shown). Suitable current leads 11 are provided for conducting current to the electrode holder 8 and the electrode 7. The electrodes may be of any suitable carbonaceous material, but I have in actual practice obtained satisfactory results employing electrodes of amorphous carbon, although I desire it understood that either or both of the electrodes may be of graphite or carbon.

In operating this furnace the vertical electrode is lowered until it touches the horizontal or bottom electrode. The charge is then placed into the furnace until it covers the contact between the two electrodes and incloses completely that portion of the electrodes between which the arc is established. The charge is of such quantity as to completely inclose the arc in order that the gases produced by the reaction will not escape through the mass and destroy the desired effect of the reaction. The electric current, preferably alternating, is then turned on. I find it advisable to start with a current of low potential, say 60 volts, and build the voltage up gradually to approximately 110. It is easier to handle the higher voltage after the furnace has been in operation a short time. The amperage is carried at approximately the ampere capacity of the electrodes employed, in accordance with the accepted practice in matters of this character and in accordance with accepted engineering formulæ. For example, one of the furnaces which I have operated in this manner was equipped with vertical electrode of amorphous carbon 6 inches in diameter and 30 inches long, and the amperage flowing through this electrode during the operation was maintained at approximately twenty-five hundred.

In operating the furnace, the vertical electrode is gradually raised throughout the operation so as to maintain such a gap between the bottom of the vertical electrode and the bottom electrode or the puddle of reduced material that builds up over the same, to hold the amperage at the desired point. The electrode is raised in this manner from time to time and charge is shoveled into the top of the furnace as required and the operation is continued in this manner until the desired amount of reduced material has been produced. When working with the crude or natural oxid of bauxite, the reduced material is fluid and may be tapped out of the furnace.

Figure 2:
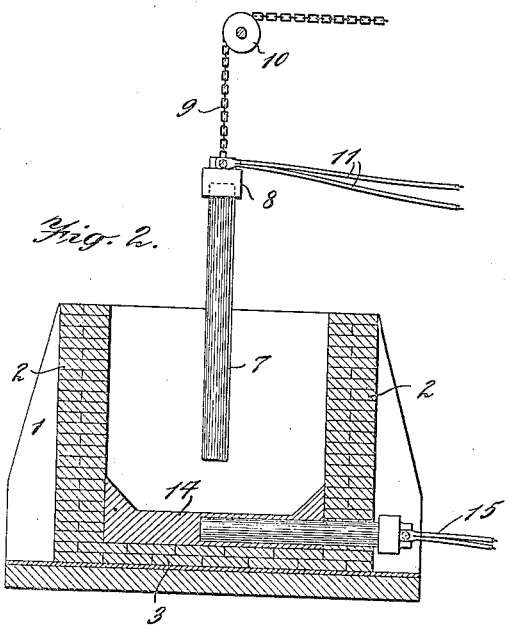
Fig. 2 is a vertical central view through another type of furnace for using a single-phase current, and in which one electrode is constituted by the bottom of the furnace.

The type of furnace shown in Fig. 2 is substantially the same as that illustrated in Fig. 1, except that the lower electrode is constituted by a carbon bottom 14 of the furnace, the same being connected to a suitable current lead 15. The operation of this furnace is the same as that described with reference to Fig. 1, and the same results may be obtained by its use.

Figure 3:
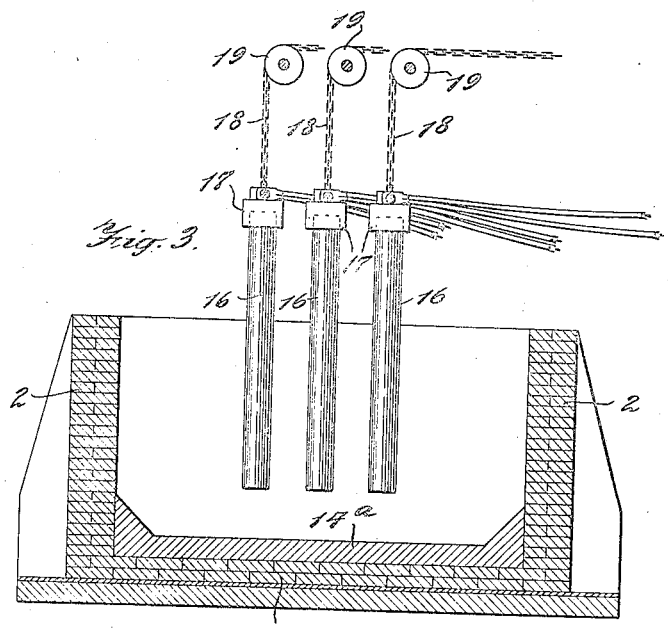
Fig. 3 is a vertical central section through a type of furnace adapted for the use of polyphase current.

In Fig. 3 is shown a furnace adapted for the use of polyphase current. For this purpose, three vertically-adjustable electrodes 16, each supported in an electrode holder 17 are provided. Each electrode holder is supported by a chain 18 extending over a pulley 19 and thence to a suitable raising and lowering means, such as a winch (not shown). The bottom 14$^a$ of the furnace is made of carbon, as the case with the furnace in Fig. 2, so as to constitute the lower electrode. The operation of this furnace need not be described in detail, as it is the same as those previously described.

In performing the process, no matter which type of furnace, above described, is employed, it is desirable that the mass of material be sufficient to completely embed the lower portion of the upper electrode, and for this purpose should extend high enough so that an unreduced body of the charge surrounds the electrode at a point above the zone of reaction. When the upper electrode is withdrawn or raised, the charge should be replenished so as to maintain the condition described.

As heretofore stated, the reaction between the aluminum oxid and the carbon takes place at a temperature above the volatilization point of the aluminum oxid, consequently the temperature afforded by the arc in the furnace must be above the volatilization point of aluminum oxid.

By the use of the expression "aluminum oxid bearing material" in the claims, I include the purer forms of aluminum oxid, and also the various forms of impure aluminum oxid, for example, bauxite.

What I claim and desire to secure by Letters Patent of the United States is:

1. The process of reducing aluminum oxid which consists in subjecting a mass consisting of particles of divided aluminum oxid bearing material incased and disseminated in a carbonaceous matrix to an electric arc inclosed by said mass.

2. The process of reducing aluminum oxid which consists in incasing and disseminating particles of divided aluminum oxid bearing material in a coky mass and subjecting the same to an electric arc.

3. The process of reducing aluminum oxid which consists in mixing aluminum oxid bearing material in a divided condition with coke-producing material, coking the mass, and then subjecting the mass to an electric arc inclosed by said mass.

4. The process of reducing aluminum oxid which consists in mixing aluminum oxid bearing material in a divided condition with pitchy material, subjecting the mixture to heat sufficient to coke the pitchy material, and then subjecting the matrix so formed containing the aluminum oxid to an electric arc inclosed by said matrix.

5. The process of reducing aluminum oxid which consists in mixing divided aluminum oxid bearing material and free carbon with pitchy material, subjecting the mixture to heat sufficient to coke the pitchy material to form a matrix of coky material containing divided aluminum oxid bearing material and free carbon, reducing the matrix and contained material to a divided condition, and then subjecting the same to an electric arc inclosed thereby.

6. The process of reducing aluminum oxid which consists in mixing aluminum oxid bearing material in a divided condition with binding material, coking the mixture, reducing the mixture to a divided condition, and subjecting the divided mixture to an electric arc inclosed thereby.

7. The process of reducing aluminum oxid which consists in binding aluminum oxid bearing material in a divided condition in a carbonaceous matrix so that said material is disseminated in and supported by said matrix, and subjecting the matrix in a divided condition to an electric arc inclosed by the divided matrix.

8. The process of reducing aluminum oxid which consists in forming a coky matrix of carbon incasing aluminum oxid bearing material in a divided condition, the carbon being present in sufficient amount to reduce the aluminum oxid to aluminum carbid, and subjecting the matrix and contained material to an electric arc inclosed by the same.

9. The process of reducing aluminum oxid which consists in forming a coky matrix of carbonaceous material inclosing aluminum oxid bearing material in a divided condition, the carbonaceous material being in such proportion as to reduce aluminum oxid to aluminum carbid, and subjecting the matrix and inclosed aluminum oxid in a divided condition to an electric arc inclosed by the same.

10. The process of reducing aluminum oxid which consists in forming a matrix of carbonaceous material containing divided aluminum oxid bearing material disseminated in said matrix, and subjecting the same in a divided condition to an electric arc, the matrix and contained material being in such quantity as to envelop the arc.

11. The process of reducing aluminum oxid which consists in forming a matrix of carbonaceous material containing divided aluminum oxid bearing material disseminated in said matrix, and subjecting the same in a divided condition to an electric arc in a furnace, the matrix and contained material being in such quantity as to envelop the arc.

12. The process of producing aluminum carbid which consists in forming a matrix of carbonaceous material containing divided aluminum oxid bearing material disseminated in said matrix, the carbon being in such proportion as to reduce the aluminum oxid to aluminum carbid, and subjecting the matrix in a divided condition to an electric arc.

13. The process of producing aluminum oxid which consists in mixing aluminum oxid bearing material in a divided condition with pitchy material and heating the same to substantially a yellow heat to coke the pitchy material to form a carbonaceous matrix containing divided aluminum oxid material, dividing the said matrix and contained material and subjecting the same to an electric arc inclosed thereby.

14. The process of producing aluminum oxid which consists in mixing aluminum oxid bearing material in a divided condition with pitchy material and heating the same to substantially a yellow heat in a reducing atmosphere to coke the pitchy material to form a carbonaceous matrix containing divided aluminum oxid material, dividing the said matrix and contained material and subjecting the same to an electric arc inclosed thereby.

In testimony whereof, I have hereunto signed my name in the presence of a subscribing witness.

LOUIS BURGESS.

Witness:
ADELE S. EBERHARDT.